June 14, 1927.
T. W. DEMAREST
VALVE
Filed Jan. 5, 1920 2 Sheets-Sheet 1
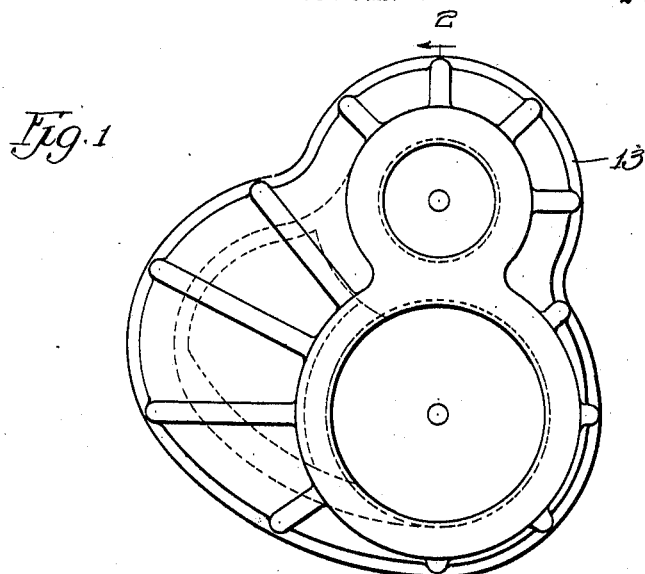
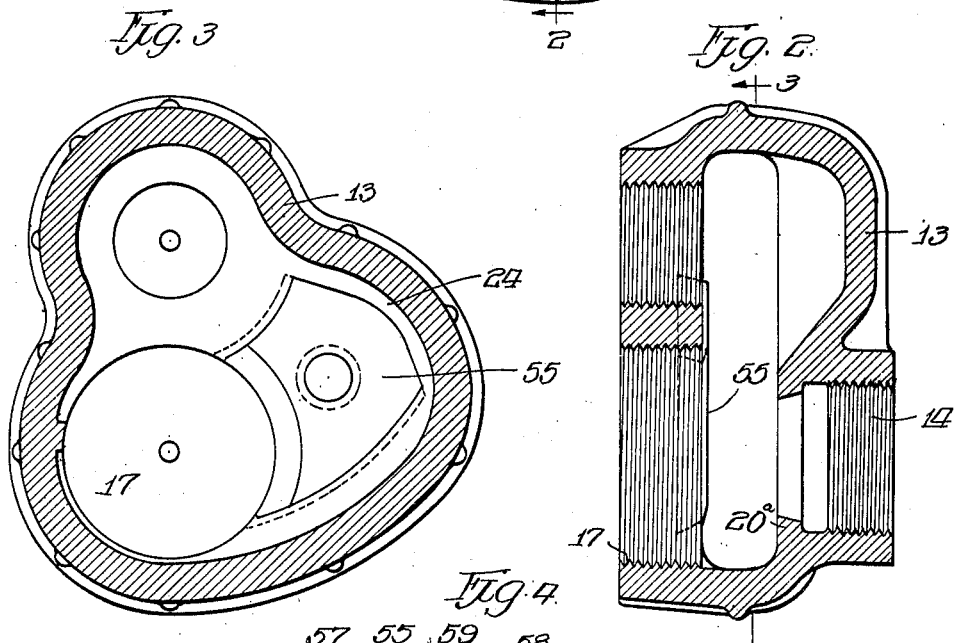
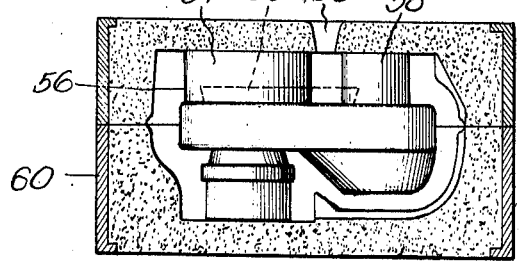
Inventor:
Thomas W. Demarest
by attorney
Paine Carpenter
1,632,220

June 14, 1927.
T. W. DEMAREST
VALVE
Filed Jan. 5, 1920
1,632,220
2 Sheets-Sheet 2
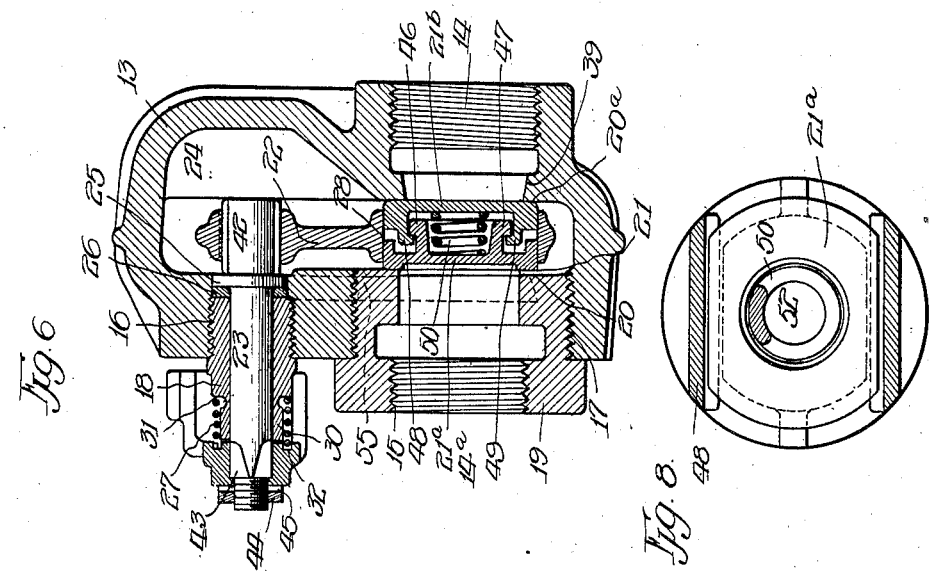
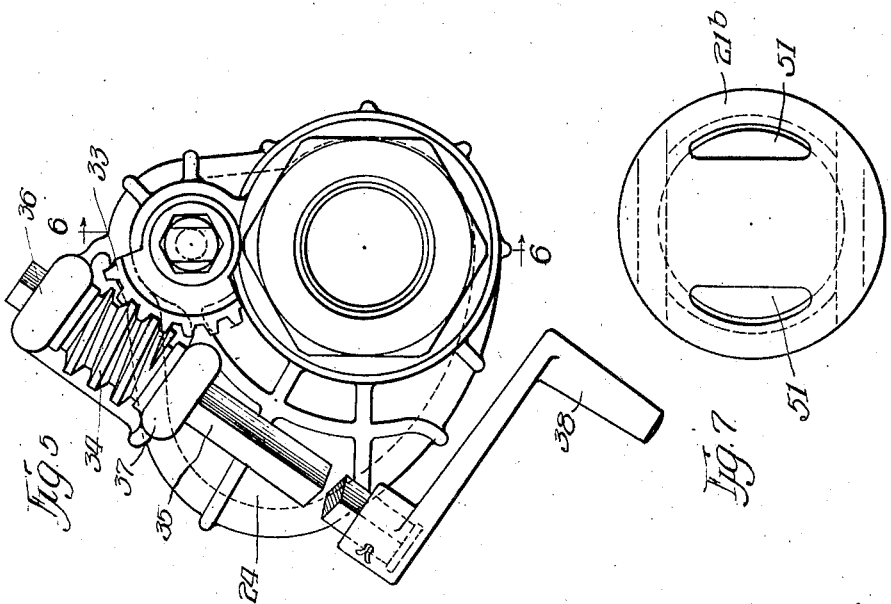
Inventor:
Thomas W Demarest
by attorney
Paine Carpenter Patented June 14, 1927.

1,632,220

UNITED STATES PATENT OFFICE.

THOMAS W. DEMAREST, OF PITTSBURGH, PENNSYLVANIA, ASSIGNOR TO THE OKADEE COMPANY, OF CHICAGO, ILLINOIS, A CORPORATION OF ILLINOIS.

VALVE.

Application filed January 5, 1920. Serial No. 349,555.

My present invention relates in general to valves, and more particularly to disc valves, and has special reference to provision of an improved form of swinging disc valve which is particularly useful as embodied in a structure including a swinging valve disc such as is useful among other elements in forming a locomotive boiler blow-off valve.

Valves of the character referred to as heretofore constructed have in general been open to one or the other of the objections that either the valve body or casing must be split in order that a smooth surface may be formed, against which the valve disc may rest or seat at all times whether the valve be open or closed, or else it has been well-nigh impossible to provide a rest or seat sufficiently smooth to avoid undue wear upon the valve disc itself, either alternative being expensive per se and often entailing leakages at times sufficient to condemn the valve so far as to require replacement of parts showing but slight wear.

My present invention, therefore, has for its objects the provision of an improved form of valve body possessing a relatively hard and smooth seat against which the valve may rest or be guided at all times; the provision of a valve body characterized by the insertion therein during the casting operation of a highly finished valve seat, rest or guide; the provision of an improved valve member specially adapted for use in connection with my improved valve body; the provision of an improved valve disc which is especially useful for swinging disc valves employing my improved valve seat or guide and particularly qualified for making compensation for any slight irregularity which may occur in the form of the valve casing with the finished insert incorporated therein in the casting operation; together with such other objects as may hereinafter appear.

In accomplishing the objects referred to and gaining certain other benefits and advantages to be below pointed out, I first form as an "insert" a smoothly finished valve seat or guide, and cast about such insert the valve body, employing in connection with the casing thus formed an improved valve disc characterized by the provision of two co-operating valve-member portions normally forced apart by a spring, which members may, nevertheless, yield relatively to one another and thereby close the passage through the valve, regardless of the side of the valve on which pressure is imposed.

In carrying out my present invention, I conveniently employ certain structures illustrated in the accompanying drawings wherein—

Figure 1 is a plan view of a valve casing embodying my present improvements;

Figure 2 is a sectional view taken on the line 2—2 of Figure 1;

Figure 3 is a sectional view taken on the line 3—3 of Figure 2;

Figure 4 is a sectional view of a conventional form of mold adapted for the formation during the process of the casting operation of a casing embodying my present improvements, with the finished valve seat or guide insert shown supported in place therein by suitable core members;

Figure 5 is a plan view of the casing of Figure 1, with certain parts implaced therein;

Figure 6 is a sectional view taken on the line 6—6 of Figure 5, showing certain operating parts and, especially my improved valve disc, in central sectional elevation;

Figure 7 is a plan view of one of the valve disc elements shown in Figure 6, and Figure 8 is a plan view partly in section of said valve disc.

Referring now more particularly to Figures 1, 2 and 3 of the drawings, it will be observed that my present improvements are here shown as applied to a valve casing 13 provided with a threaded aperture 14 for the reception of the necessary pipe connecting the valve to the boiler; likewise, referring now more particularly to Figures 5 to 8, it will be seen that on the other side, the casing is provided with a threaded aperture 17 for the reception of a threaded bushing member 19 (see Figure 6). The inner face of the member 19 is smoothly faced off to form the valve seat 20, against which the valve member or disc 21 is arranged to seat in closing. A threaded aperture 15 is provided in the member 19 for the reception of a pipe which may be a discharge pipe or the like.

The valve disc 21 is provided with a substantially cylindrical periphery in order that it may slide axially to and fro in the aperture 28 in the swinging disc carrier 22 by means of which it is moved to and fro across the valve seat. This member 22 is non-rotative, but is preferably slidable axially, and connected to an operating pintle 23 so that by rotation of the member 23 the carrier 22 and the disc 21 carried thereby may be moved in an arc transversely across the valve seat into the chambered side portion 24 of the casing 13 provided for its reception. When the valve casing member has been moved into such chamber 24 there is an unobstructed passage for fluid through the valve.

For decreasing the resistance to the flow of fluid through the valve casing, a conical portion 39 is arranged on the pressure side of the valve so that the stream of steam or other fluid, as it leaves the inlet side of the casing is given a somewhat contracted form so that the edges of the stream will not contact to any great extent with the edge of the valve seat. This reduces the resistance to flow of fluid as it diminishes the eddying in the spaces in the valve allowed for movement of the members 21 and 22.

The valve member 21 is arranged to move independently of the carrier 22 and the pintle 23 so that it can be kept in fluid tight contact with the valve seat by the pressure of the fluid, as well as by the spring hereinafter referred to.

To enable the disc member 21 to be removed from the casing independently of the valve carrier 22, and consequently of the pintle 23, the valve member 21 is preferably arranged so that it can move axially to and fro in the aperture 28 of the member 22. Although such movement is not essential to the seating of the member 21 on the valve seat 20, in view of the fact that the member 22 is slidably mounted on the end 42 of the pintle 23, which allows the member 21 to move axially to and from the valve seat independently of the pintle 23 and of the spring hereinafter referred to, such construction materially aids in the automatic adjustment of the parts.

The pintle 23 is mounted in a threaded sleeve 18 screwed into a threaded aperture 16 in the casing 13. The escape of fluid around the pintle 23 is prevented by providing at the inner end a shoulder 25 which is normally pressed into fluid tight engagement with the packing 26 by the pressure of the fluid inside the valve casing, 13.

The shoulder 25 is of such diameter that the pintle 23 can be placed in position in the casing through the aperture 16 after which, or simultaneously with which, the sleeve 18 may be screwed into the same aperture.

As the pintle 23 is introduced through the aperture 16 and the member 22 through the aperture 17, provision is made for sliding engagement of the pintle 23 and the member 22. For this purpose two flattened portions are formed on the end 42 of the pintle 23, and the apertured member 22 is complementally formed so that relative rotation cannot take place, while nevertheless the parts can slide axially relatively to each other.

In order to keep the shoulder 25 against its seat when no fluid pressure is present, I employ a spring 27 located externally of the casing on a prolongation 30 of the sleeve 18 with one end resting on the shoulder 31 of the same sleeve, and the other end resting in the annular recess 32 formed in the sector 33 by means of which the pintle 23 is rotated, such rotation being effected by a worm 34 in gear with the sector 33 and mounted on a shaft 35, suitably journaled in projections 36 and 37, preferably formed integrally with the valve casing. A handle 38 is provided for rotating the shaft 35.

The end 43 of the pintle 23 to which the sector 33 is attached, is made in the general form of a cone, and is preferably formed with flats thereon adapted to prevent relative rotation of the sector 33 and the pintle 23. A grip-nut 44 is arranged on the extreme end of the pintle 23 and is formed with a channel 45 on its under side so that the central part of the grip-nut can bend and bind the shoulders on the pintle 23.

As a further assurance that the valve 21 shall at all times seat against the seats 20 and 20$^a$, when fluid under pressure is alternatively admitted through the openings 14 and 14$^a$, the valve being in its closed position, I preferably form the valve disc member 21 of two parts 21$^a$ and 21$^b$, slidably engaging each other by the channelled flanges or L-shaped projections 46, 47, formed on the member 21$^a$, and 48, 49, formed on the member 21$^b$, said parts 21$^a$ and 21$^b$ being yieldingly resistantly forced apart by means of a spring 50 resting in a housing 52.

For preventing accidental separation of the members 21$^a$ and 21$^b$, the member 21$^b$ is formed with openings indicated at 51, 51 with which the end of the spring 50 may engage and which serve to prevent the member 21$^a$ from moving laterally relatively to the member 21$^b$ when the spring 50 is expanded. Accordingly, for the separation of the members 21$^a$ and 21$^b$, a rod may be inserted into the openings 51 by means of which the spring 50 may be compressed and disengaged from such openings and thereby the members 21$^a$ and 21$^b$ disengaged when desirable for any reason, as for regrinding the seating surfaces of such valve members, 21$^a$ and 21$^b$.

Reverting now to Figures 2, 3, 5, and 6, it will be observed that while the valve seat 20 is formed on the removable member 19 and so may be readily ground and re-ground, when desired, and that likewise the valve seat 20$^a$ is uncovered by the removal of the bushing member 19, and so may be readily ground and re-ground, nevertheless, owing to the location of the opening 17 at one side of the valve casing 13, it is impracticable to insert the tool through said opening 17 into the lateral chamber 24 in order to grind off any roughness from the interior of said chamber 24 and thereby save the valve member 21 from abrasion thereby.

In order to overcome this incident to unitarily cast valve bodies for swinging disc valves, I provide a smooth and highly finished piece of metal 55 adapted to form a rest or seat for the valve 21 in its open position, and a guide therefor when it is moving therefrom into its closed position, such insert 55 being provided with suitably beveled edges such as are indicated at 56 in order that it may be supported by the core portions 57 and 58 and unite with the casing 13 when the metal forming such casing is poured through the opening 59 into the mold 60, such finished insert 55 being so carefully disposed in such core portions 57 and 58 that in the resultant valve casing said insert 55 interlocks therewith and lies in substantially the same plane as the valve seat 20.

In view of the smooth and highly finished surface of said insert 55, no such abrasion of the valve member 21 as is customarily incident to the use of integrally cast valve bodies, is incurred, and by use of a valve member having yieldingly resistantly separated portions 21$^a$ and 21$^b$, any tendency of the valve disc 21 to cant in the swinging carrier yoke 22, incident to any slight displacement of the insert 55, is overcome.

Moreover, by virtue of the employment of expansible valve disc 21, formed conveniently by the use of co-acting members such as those indicated at 21$^a$ and 21$^b$ forced apart as by the spring 50, both of the passages 14, 14$^a$ are closed, by the contact of the valve disc with the seats 20, 20$^a$, not only against direct pressure from the boiler or other fluid container but also against back-pressure of discharged fluid in the event that another one of a series of boilers is being blown into a common discharge header, the advantages thus pertaining to my improved valve structure being readily apparent to those who are skilled in the art to which it pertains.

It will also be appreciated that a further advantage of my present invention resides in the fact that the valve guide or seat 55, which is united with the body of the valve casing during the casting operation, may be formed either of a different quality of the same metal, such as iron, when cast iron is used for forming such a body, or of a different metal, such, for example as brass, when as frequently and even preferably may be the case, it is desired to form such member 55 of such a material.

Uniting the insert 55 and the casing, by casting the latter about the former, exhibits obvious advantages over any other method of procedure known to me, in that by the process disclosed in the present specification a perfectly tight joint between the insert and the casing is attained, and thereby not only is all danger of leakage obviated but also the expense of mechanical processes is avoided.

Having thus described my invention and illustrated its use, what I claim as new and desire to secure by Letters Patent is:

1. A valve device comprising, in combination, a valve body having a passage provided with a seat, and a valve for interrupting said passage by contact with said seat including a pair of relatively movable rigid members and a spring for constraining said relative movement and for preventing accidental lateral movement of said members when expanded.

2. A valve device comprising, in combination, a valve body having a passage provided with a seat, and a valve for interrupting said passage by contact with said seat, said valve including a pair of relatively movable and slidably interlocked members and a yieldingly resistant element for constraining their relative movement.

3. A valve device comprising, in combination, a valve body having a passage provided with a seat, and a valve for interrupting said passage by contact with said seat including a pair of relatively movable L-members each provided with cooperating L-shaped projections for interengagement, one of said last mentioned members being adapted to receive a spring, and a spring carried by one of said members and bearing against the other thereof for constraining their relative movement.

4. A valve device comprising, in combination, a valve body having a passage for fluid and a chamber for the reception of a swinging valve, and a swinging valve for interrupting said passage including a pair of relatively axially movable members and a yielding resistant element therebetween for constraining their relative movement and for preventing relative lateral displacement of said members when expanded.

5. A valve device comprising, in combination, a valve body having a passage for fluid, a pair of oppositely disposed ports each provided with a seat, and a chamber for the reception of a swinging valve, and a swinging valve for interrupting said passage including a pair of members slidably interlocked but movable relative to each other and the operating arm thereof and a yieldingly resistant element therebetween for forcing them into contact with said seats.

6. A valve device comprising, in combination, a cast valve body having a passage for fluid provided with a valve seat, a chamber for the reception of a swinging valve, and a separate auxiliary valve guide or seat united to the body during the casting thereof, and a swinging valve engaging said guide or seat only when in open position.

7. A valve device comprising, in combination, a cast valve body having a passage for fluid and a valve seat, a chamber for the reception of a swinging valve, and a separate auxiliary valve guide or seat at one side of said first seat and united to the body during the casting thereof, and a swinging valve carrier provided with a disc for interrupting said separate passage, said guide or seat being adapted to support said disc when the valve is open.

8. A valve device comprising, in combination, a cast valve body having a passage for fluid and a valve seat bordering said passage, a chamber for the reception of a valve, and an auxiliary separate valve guide or seat united to the body during the casting thereof and arranged in said chamber, and a valve for interrupting said passage.

9. A valve device comprising, in combination, a valve body having a passage for fluid, a pair of oppositely disposed ports each provided with a seat, a chamber for the reception of a swinging valve, a separate valve guide or seat united to the body during the casting thereof, and a swinging valve carrier provided with a disc including a pair of relatively movable members and a yieldingly resistant element therebetween for forcing them into contact with said seats.

10. A valve device comprising, in combination, a valve body having a passage for fluid, a pair of oppositely disposed ports each provided with a seat, a chamber for the reception of a swinging valve, a separate valve guide or seat united to the body during the casting thereof, and a swinging valve adapted to cover said seats in closing, said guide or seat being adapted to support said swinging valve as it moves into said chamber in opening.

11. A valve device comprising, in combination, a valve body having a passage for fluid, a pair of oppositely disposed ports each provided with a seat, a chamber for the reception of a swinging valve, a separate valve guide or seat united to the body during the casting thereof, and a swinging valve carrier provided with a disc movable relatively thereto for interrupting said passage, said guide or seat being adapted to support said disc when the valve is open.

12. A valve device comprising, in combination, a cast valve body having a passage for fluid bordered by a valve seat, and an auxiliary separate valve guide or seat united to the body during the casting thereof, and a valve for interrupting said passage.

13. The process of forming a valve body including on its inner surface a main valve seat, which includes the provision of a suitable auxiliary valve guide or seat and the casting thereabout of a valve body, whereby said body and seat are united during the casting operation.

14. The process of forming a valve body including on its inner surface a main valve seat, which includes the provision of an auxiliary polished valve guide or seat of a contour adapted to interlock with the metal of the valve body and main seat, suitably supporting same in a mold, and then pouring molten metal into the mold and into contact with said guide or seat, whereby said auxiliary body and seat are united during the casting operation.

15. The process of forming a cast iron valve body including an integral main valve seat on its inner surface and a brass insert which includes the provision of a suitable brass insert, and the casting thereabout of an iron valve body with said insert to one side of said main seat, whereby said iron body and brass insert are united during the casting operation.

16. The process of forming a cast metal valve body including on its inner surface a main valve seat and a metallic insert of a different quality to afford an auxiliary seat, which includes the provision of a suitable insert, and the casting thereabout of the metallic valve body, whereby said body and insert are united during the casting operation.

17. A valve device comprising, in combination, a one-piece valve body having a passage provided with a seat, and a valve for interrupting said passage by contact with said seat including a pair of members movable relative each other and an arm operating same, a guide surface inlaid in the body and formed of material having different characteristics than those of the valve body for receiving the valve when open, and a yieldingly resistant element between said members.

18. A valve device comprising, in combination, a valve casing, having a passageway provided with a pair of seats, a swinging arm, a pair of members carried by the arm, movable relatively to each other and the arm, said members being laterally separable, a yieldingly resistant element between said members for constraining their relative movement and for preventing their accidental lateral separation, and means for preventing complete relatively axial separation of said members.

19. A valve device comprising, in combination, an integral valve casing having a passage for fluid provided with a pair of opposed valve seats, a swinging valve disc between said seats and composed of an actuating arm and a pair of closure members movable relative to each other and to said arm, one only of said seats being removable bodily from the casing, and a separate cast in guide adjacent to said seat for supporting one of said closure members when the valve is open.

20. A valve device, comprising, in combination, a valve body having a passage provided with a seat, and a valve for interrupting said passage by contact with said seat including a pair of relatively movable rigid members, means for interlocking said members against complete separation axially, and a yieldingly resistant element cooperating with said means for constraining relative movement of the members and for preventing their accidental separation laterally.

In testimony whereof I have hereunto signed my name.

THOMAS W. DEMAREST.